United States Patent [19]

Siegert

[11] Patent Number: 5,092,997
[45] Date of Patent: Mar. 3, 1992

[54] APPARATUS FOR CONCENTRATION OF MACROMOLECULAR SOLUTIONS

[76] Inventor: Martin Siegert, Bergengruenstrasse 49, D-1000 Berlin 38, Fed. Rep. of Germany

[21] Appl. No.: 459,780
[22] PCT Filed: Jun. 28, 1988
[86] PCT No.: PCT/DE88/00394
 § 371 Date: Feb. 15, 1990
 § 102(e) Date: Feb. 15, 1990
[87] PCT Pub. No.: WO89/00285
 PCT Pub. Date: Jan. 12, 1989

[30] Foreign Application Priority Data

Jun. 29, 1987 [DE] Fed. Rep. of Germany ....... 3721847

[51] Int. Cl.5 ............................................. B01D 61/18
[52] U.S. Cl. .................................... 210/232; 210/247; 210/321.84
[58] Field of Search ..................... 210/34.84, 447, 247, 210/232, 645

[56] References Cited

U.S. PATENT DOCUMENTS 3,817,379 6/1974 Zipilivan et al. ..................... 210/94
4,123,224 10/1978 Givner ................................... 422/59
4,375,415 3/1983 Lavender ................... 210/321.84 X

FOREIGN PATENT DOCUMENTS 421058 7/1961 Fed. Rep. of Germany .
2110751 10/1971 Fed. Rep. of Germany .
2546500 4/1977 Fed. Rep. of Germany .
2920253 11/1979 Fed. Rep. of Germany .
2553005 7/1984 France .

*Primary Examiner*—Frank Spear
*Attorney, Agent, or Firm*—Heslin & Rothenberg

[57] ABSTRACT

The invention relates to a method for concentrating macromolecular solutions, more particularly of protein molecules, to a defined end volume lying in the ul-range and to a filter for carrying out the method. The liquid phase of any amounts of solutions is pressed through an upright filter leaf. The filtered constituents are directed down through gravity and are collected in a concentrate chamber.

13 Claims, 4 Drawing Sheets

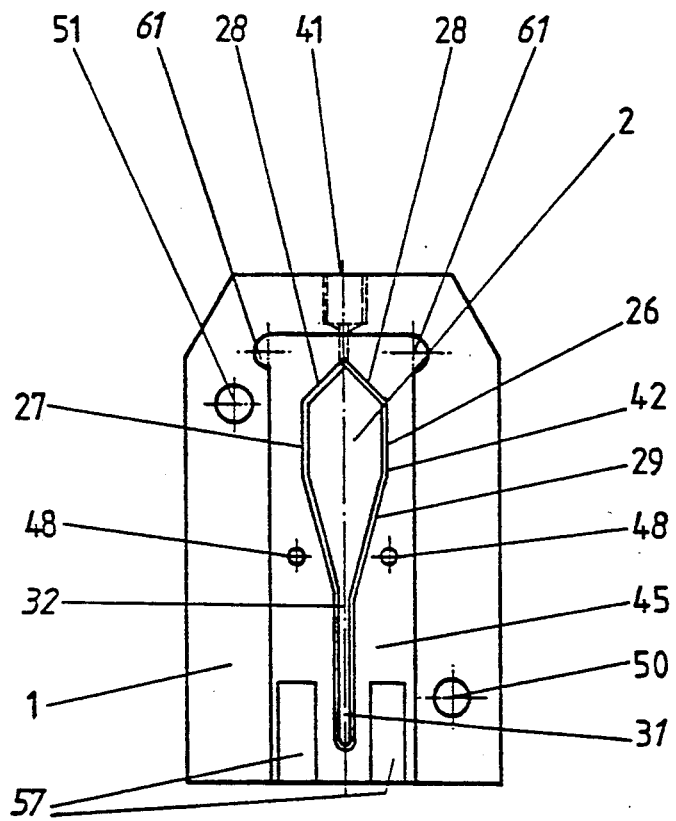
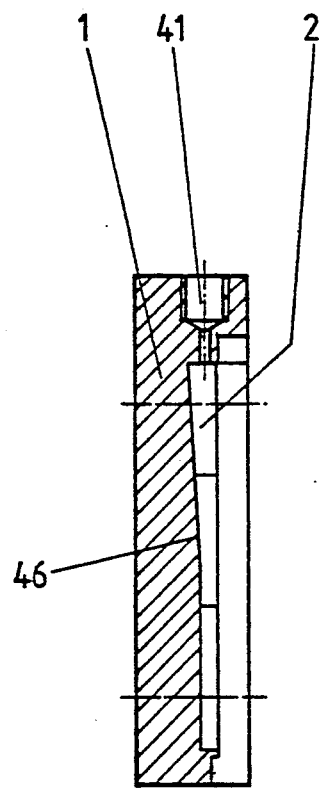
Fig. 1
Fig. 2

APPARATUS FOR CONCENTRATION OF MACROMOLECULAR SOLUTIONS

BACKGROUND OF THE INVENTION

The invention relates to a method for concentrating solutions containing macromolecules, more particularly solutions of protein molecules, to a defined end volume and a filter for carrying out this method.

In the publication No. 1/130 F of AMICON Division, W.R. Grace & Co - AMICON GMBH Witten, a commercially available disposable ultrafilter is described for the static concentration of small amounts of macromolecular solutions. This ultrafilter has eight separated upright chambers which can be used at different times for different solutions. The chambers are bound by upright membranes with selective permeability. An absorbing material is placed on the back of these membranes. This absorbing material, through capillary action, sucks the liquid phase from the solutions in the chambers and into the absorbing material. The macromolecular constituents are thereby concentrated in the solutions remaining in the chambers. The level of the solutions in the chambers drops. The chambers are provided with marks which indicate the degree of concentration. As soon as the desired mark is reached in a chamber during the concentration, the solution still present with the macromolecules is removed from the chamber. A lower section of the membrane is made impermeable in order to hinder further concentration. In the known concentration method a batch process is worked. This results in a local thickening of a stationary solution by removal of the liquid phase. The process of concentration is restricted by the capacity of the absorbing material. If larger quantities of solution are to be concentrated, the known device leads to an exceptionally complicated method of operation. A degree of concentration of any level cannot be reached. With this method a part of the macromolecules is deposited on the membrane as the liquid phase is sucked through same. These macro molecules remain sticking to the membrane and do not pass into the concentrate as the solution sinks further down. This loss of substance causes the effectiveness of the concentration method to be irreversibly reduced.

U.S. Pat. No. 4,632,761, column 1, lines 37 to 41, it is expressly stated that with the ultrafilter previously described, a complete drying of the filtered constituents is produced by surface tensions which act on the concentrate in the area of the filter section which has been rendered impermeable together with capillary suction forces. The preparation is thereby unusable. This danger of drying out is pointed out by the manufacturer through a warning packed with the ultrafilters.

From U.S. Pat. No. A 4,123,224 a method and device are known for concentrating solutions containing macromolecules. The solution is introduced into a concentration chamber defined by a filter. An absorbent material is placed on the filtrate side of the filter. The concentrate is collected in a concentrate chamber adjoining the concentration chamber and the filter surface becomes smaller towards the concentrate chamber. The concentrate is collected in the concentrate chamber with defined end volume lying screened from the filter leaf.

SUMMARY OF THE INVENTION

The invention is based on the object of providing a method and filter with which solutions can be concentrated with optimum yield up to a predetermined extent up to 15 ul.

An adjustable pressure is advantageously produced in the solution so that amounts of solution are pressed in the concentration chamber through the filter leaf or membrane. The capacity limit which occurs with suction absorption is excluded. By selecting the adjustable pressure and filter material, the filter process can be set for optimum results. In the solution, in advantageous manner through a filtration in a section of the concentrate chamber screened per se from the filter leaf beneath the concentration chamber, a flowing component directed into this chamber is produced through which the filtered-off macromolecular constituents are transported into the chamber. It is not necessary to lower and observe the level of the solution in the concentration chamber for concentrating so that the danger of drying out can also be eliminated. A concentration can be reached, by way of example for carrying out a preparatory work. The concentration can also be carried out however in order to perform associated analytical work where higher concentrations facilitate greater accuracy.

In an advantageous way the concentration can be improved if in the concentration chamber the solution is pressed through the filter leaf in discrete areas which converge radially at a point on the boundary between the concentration and concentrate chambers. A further filtration is carried out locally in the concentrate chamber beneath this point in order to produce the flowing components directed therein.

The method according to the invention brings the advantageous possibility of being able to preconcentrate the solution in at least one pre-filter of greater capacity. The pre concentration can for example also be carried out in a cascade-type pre-filter. In order to screen the concentrate chamber from the filter leaf and render the filter leaf inactive in this area, the partial region of the filter leaf to be deactivated can with advantage be covered by means of a mask.

Since according to the invention the solution is not conveyed through the filter leaf into an absorbent material but is pressed through the filter leaf, there is the advantageous possibility of backflushing the filter leaf in order to loosen the macromolecular constituents from their position adhering to the filter leaf and to return them to the concentrate. A particularly simple method consists in raising in a suitable way the level at which the liquid phase flows out of the filter. This produces a pressure gradient which opposes the filtering pressure gradient.

The invention offers the possibility of producing the adjustable pressure in the solution by means of a spring or weight biassed or pneumatically, hydraulically or motor driven piston or piston pump.

In order to speed up the sedimentation of the filtered-off macromolecules in the concentration chamber—if this is desired or essential—a centrifugal force is exerted with advantage on the solution at least in the concentration chamber. A centrifuge or pendulum can be used for this. The centrifugal force can also with advantage still produce the adjustable pressure in the solution. For this, for example, a suitably dimensioned structural part, more particularly a piston, which produces the pressure in the solution is biassed by a centrifugal force in a dosing apparatus.

An advantageous embodiment of a filter for carrying out the method is designed as a sandwich assembly. The sandwich assembly comprises a filter chamber disc in which a concentration chamber is formed whose outline is hexagonal with two parallel sides and two pairs of converging isosceles sides, wherein the corner formed by the lower side pair is connected to a concentrate channel. Furthermore this sandwich assembly has a mask of hydrophobic material placed on the filter chamber disc wherein this mask has recesses or openings congruent with the outline of the concentration chamber and a section of the concentrate chamber. An ultrafilter leaf or membrane is placed on this mask. Furthermore a filter support disc containing channels for the liquid phase of the solution is placed on the filter chamber disc.

At the lower isosceles side pair of the concentration chamber the material collecting in front of the filter in this chamber can slide further down towards the concentrate channel. The converging isosceles sides connected to the upper ends of the parallel sides of the concentration chamber allows the easy discharge of air or gas bubbles should these form in the concentration chamber.

With particular advantage a peripheral bead is formed on the edge of the hexagonal concentration chamber and the concentrate channel connected therewith and this bead ensures a reliable seal of the concentration chamber and concentrate chamber at the filter leaf.

In order to optimize concentration the depth of the concentration chamber decreases from the filling channel to the concentrate chamber.

So that the outlet tip of a dosing piston, for example a disposable syringe, can be safely accommodated, the filling channel is advantageously provided with a Luer-Look closure. In order to optimize the seal of the concentration chamber, a contact pressure socket is formed on the filter support disc. This contact pressure socket which covers the peripheral bead on the concentration chamber and concentrate channel has at least three parallel open channels in the surface area lying inside the peripheral bead of the concentration chamber. The open channels open by their lower ends into an open channel which is formed in the surface area lying inside the area of the peripheral bead of the concentrate channel and which in turn is connected to a closed discharge outlet formed inside the filter chamber body. When the sandwich assembly is braced together the contact pressure socket presses an inlaid rectangular filter leaf against the peripheral bead in the filter chamber disc to provide a secure seal. To fix the elements, for example the filter leaf and/or mask which are to be placed in the sandwich assembly, at least two fixing pins are formed on the filter chamber disc to engage in suitably aligned bores in the filter support disc.

In a preferred embodiment, the filter chamber disc described above has a parallelepipedic open recess wherein the concentration chamber and concentrate channel are designed in the bottom of the recess. The filter support disc is provided with a parallelepipedic web which fits tight into the recess and which is provided on its surface with the contact pressure socket. This embodiment allows the easiest fitting of the structural elements in the sandwich assembly. Specialized experience or skills are not required for this. To facilitate insertion of the ultrafilter during assembly and the removal of the filter leaf and mask after filtration, a pair of outward curves is provided at the upper end of the parallelepipedic recess in the side walls so that when the filter leaf is inserted, the air located beneath the filter leaf can flow out through these curvatures. Two grooves are formed in the bottom of the parallelepipedic recess at the open end. Auxiliary tools are inserted into these grooves in order to lift the filter leaf and mask out of the recess. In order to hold the composite sandwich assembly in this state, at least two pairs of bores are provided in the filter chamber disc and filter support disc. These pairs of bores are aligned with each other and accommodate a tension device for the sandwich assembly. To insert the above described embodiments of a filter into a centrifuge or other device which produces an additional gravity force, the filter chamber disc and filter support disc are advantageously designed as complementary partial cylinders.

BRIEF DESCRIPTION OF THE DRAWINGS

Embodiments of the invention will now be explained with reference to the drawings in which:

FIGS. 1 and 2 show a plan view and sectional view of an embodiment of the filter chamber disc.

DETAILED DESCRIPTION

Figure 3:
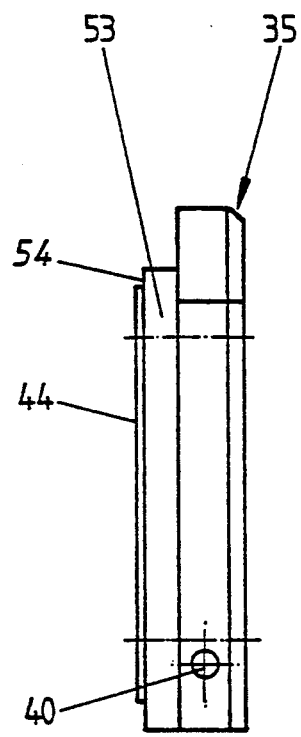
FIGS. 3 and 4 show a side view and side view of a filter support disc which is to be fitted to the filter chamber disc.
Figure 4:
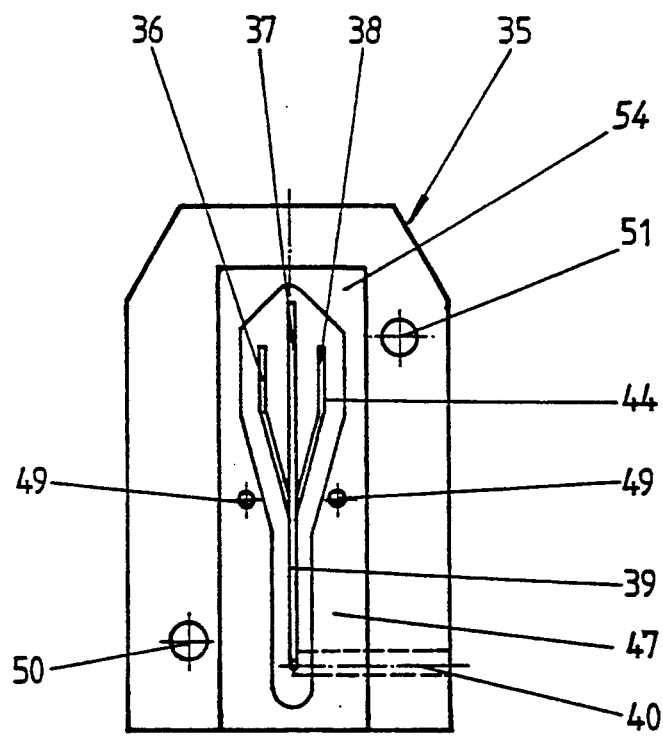
Figure 5:
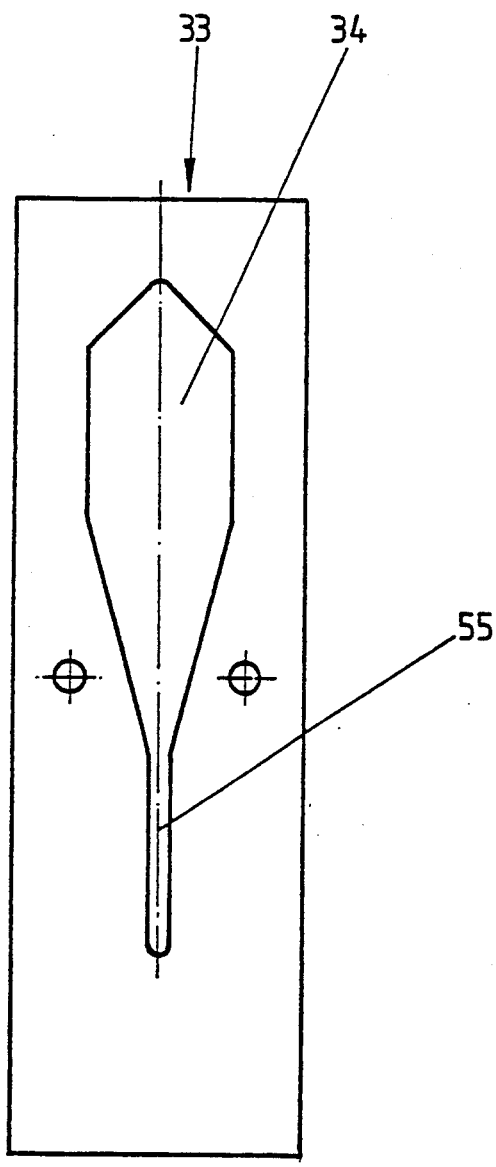
FIG. 5 shows a plan view of a mask and FIG. 6 shows a side view of a tensioned sandwich assembly of a filter.

The filter chamber disc or plate 1 illustrated in FIG. 1 has a parallelepipedic recess 45 which is open at the bottom. A concentration chamber 2 having a hexagonal outline is formed in the bottom 46 of this recess 45. The concentration chamber 2 is defined by two parallel sides 26 and 27. The upper ends of these parallel sides 26,27 are adjoined by a pair 28 of isosceles sides. The corner of the concentration chamber 2 formed by these sides 28 is connected to a filling channel 41 which is fitted with a Luer-Lock closure 43. The lower ends of the parallel sides 26,27 of the concentration chamber 2 are adjoined by a pair of isosceles sides 29. Advantageously the length of the sides in this pair 29 is greater than the length of the sides in the diametrically opposite pair 28. The corner of the concentration chamber 2 formed by the downwardly converging pair of sides 29 communicates with a concentrate channel 31 whose lower end is closed off. In the bottom 46 of the recess 45 on either side of the lower side pair 29 of the concentration chamber 2 there are fixing pins 48 for a rectangular ultrafilter leaf (not shown) and a mask.

As shown in FIG. 3, the filter support disc or plate 35 has a parallelepipedic web 53 which can be inserted with a tight fit into the recess 45 of the filter chamber disc 1. On the upper side 54 of the web 53 there is a contact pressure socket 44 which in the assembled state covers the peripheral bead 42 in the filter chamber disc 1. The larger dimensioned outline of this contact pressure socket 44 is designed to conform with the shape of the peripheral bead 42. Three parallel open channels 36,37,38 are formed in this contact pressure socket 44, with their lower ends opening into a channel 39 which in the assembled state lies opposite the concentrate channel 31 and is separated by a filter leaf section and a section of the mask. The channels 36,37,38,39 are open at the top. The channel 39 is connected to a closed discharge outlet 40 which runs in the body of the filter support disc 35.

The filter chamber disc 1 and filter support disc 35 have pairs of bores 50, 51 into which a tension device is inserted when the sandwich assembly is in the assembled state. The tension device presses the filter chamber disc 1 and filter support disc 35 together.

When fitting the sandwich assembly together, first the mask 33, which is made of hydrophobic material to eliminate the capillary force and is shown in FIG. 3, is placed on the peripheral bead 42. This mask 33 has a recess or opening 34 which is congruent with the sides of the concentration chamber 2 and thus congruent with the peripheral bead 42 and has at the lower end a recess or opening 55 which only covers the section 32 of the concentrate channel 31. The difference in length between this recess 55 and the length of the concentrate channel 31 determines the defined volume.

A rectangular ultrafilter leaf or membrane (not shown) is placed on this mask 33 and centered by the fixing pins 48.

The web 53 of the filter support disc 35 is inserted in a simple way to fit into the recess 45 of the filter chamber disc 1 wherein the bores 49 accommodate the fixing pins 48.

The sandwich assembly can now be pressed together by using the pair of bores 50, 51.

The solution is introduced under pressure into the concentration chamber 2 through the Luer-Lock closure 43 and then forced into the channels 36, 37, 38 through the filter leaf (not shown) which is compressed between the peripheral bead 42 of the filter chamber disc 1 and the contact pressure socket 44 of the filter support disc 35. The macromolecules filtered off in the concentrate chamber 4 of the concentration chamber 2 sink down in the concentration chamber 2 and slide down further along the converging side pair 29. Filtration still takes place in the section 32 of the concentrate channel 31. A flowing component directed into the concentrate channel 31 is thereby produced in the collecting area of the downwardly sinking macromolecules so that these are transported into the concentrate channel 31 through this flowing component in addition to the force of gravity. If during concentration macro molecules become fixed on the filter leaf 8, the outlet level which connects with the discharge outlet 40 can be raised sufficiently to produce an opposing pressure gradient at the filter leaf 8 through which the macromolecules are removed from the filter leaf 8 and returned to the concentration chamber 2 in which they can then sink down.

As shown in FIG. 1, two outward curvatures 61 are provided at the upper end of the recess 45 in the side walls so that the air can escape as the rectangular filter leaf is inserted. At the lower end there are two grooves 57 provided at the bottom 46 of the recess 45. An auxiliary tool inserted into these grooves can lift out the mask and filter leaf at the end of the filtering process.

Figure 6:
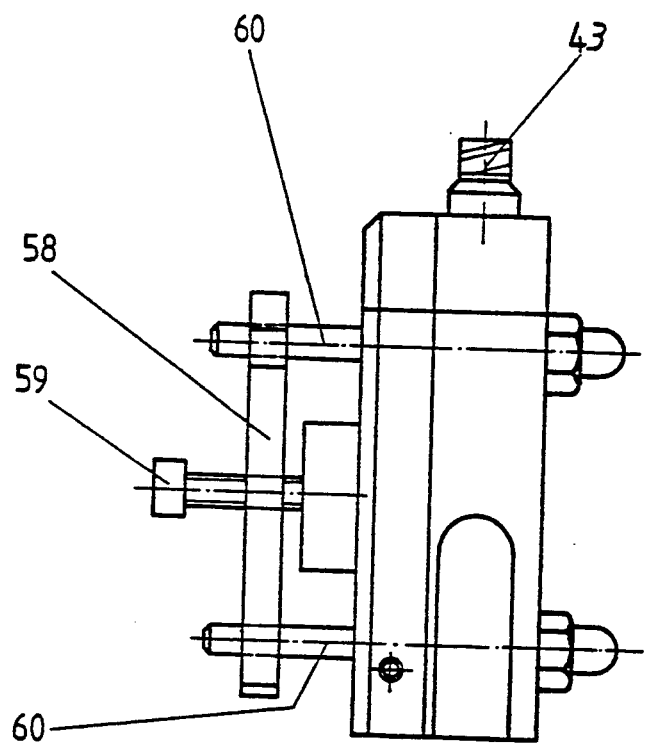

As shown in FIG. 6, tension pins 60 are inserted into the bores 50, 51 described above. These tension pins support a tension web 58 into which a tightening screw 59 is screwed so the the parts of the sandwich assembly can be pressed together.

At the end of concentration the concentrate is removed from the concentrate channel 31, for example by means of a syringe inserted through the filling channel 41.

I claim:

1. Filter for concentration solutions containing macromolecules, more particularly solutions of protein molecules, to a defined end volume, wherein the solution is introduced into a concentration chamber defined by a flat filter leaf and having a filter surface which becomes smaller towards a concentrate chamber, quantities of solution are pressed through the filter, and the concentrate is collected in the concentrate chamber which adjoins the concentration chamber, the filter being characterized by a sandwich assembly comprising:
    a filter chamber disc in which the concentration chamber is formed, the concentration chamber having a hexagonal outline including two parallel sides and two pairs of isosceles converging sides, an end of said concentration chamber formed by a lower one of said pairs of isosceles converging sides being connected to a concentrate channel;
    a mask of hydrophobic material placed on the filter chamber disc and provided with a recess congruent with the outline of the concentration chamber and a section of the concentrate channel;
    an ultrafilter leaf placed on the mask; and
    a filter support disc placed on the filter chamber disc the filter support disc having channels for the liquid phase of the solution.
2. Filter according to claim 1 further comprising:
    a peripheral bead provided on an edge of the hexagonal concentration chamber and the concentrate channel connected with same.
3. Filter according to claim 1 or 2 further comprising:
    a filling channel connected to one corner of the concentration chamber.
4. Filter according to claim 3 wherein the filling channel is provided with a LuerLock closure.
5. Filter according to claim 1 wherein the depth of the concentration chamber decreases from the filling channel towards the concentrate channel.
6. Filter according to claim 1 further comprising:
    a contact pressure socket formed on the filter support disc to cover the peripheral bead on the concentration chamber and on the concentrate channel, the socket having at least three parallel open channels in the surface area lying inside the peripheral head of the concentration chamber and wherein the channels open into an open channel formed in the surface area inside the peripheral bead of the concentrate channel, said open channel being and connected to a closed channel.
7. Filter according to claim 1 wherein the filter chamber disc has at least two fixing pins, and the filter support disc has at least two bores which are aligned therewith.
8. Filter according to claim 1 wherein:
    the filter chamber disc has a parallelepipedic open recess in whose base the concentration chamber and concentrate channel are formed,
    the filter support disc is fitted with a parallelepipedic web which can be inserted with tight fit into the recess, and
    the contact pressure socket is mounted on the surface of the web.
9. Filter according to claim 8, wherein:
    two outward curvatures are formed on the upper end of the parallelepipedic recess, and
    two grooves are formed in the base of the recess at the open end.

10. Filter according to claim 1 wherein at least two pairs of aligned bores are formed in the filter chamber disc and in the filter support disc and house a tension device for the sandwich assembly.

11. Filter according to claim 1 wherein the filter chamber disc and the filter support disc are designed as complementary partial cylinders.

12. Filter according to claim 1 wherein the concentrate chamber is screened from the filter leaf by means of a foil mask of teflon.

13. Filter according to claim 1, wherein the foil or mask of teflon has a thickness in the range from 0.25 mm to 0.75 mm, more particularly 0.5 mm.

* * * * *

UNITED STATES PATENT AND TRADEMARK OFFICE
CERTIFICATE OF CORRECTION

PATENT NO. : 5,092,997
DATED : March 3, 1992
INVENTOR(S) : Siegert, Martin

It is certified that error appears in the above-identified patent and that said Letters Patent is hereby corrected as shown below:

Column 6, line 1, "concentration" should read --concentrating--.

Column 6, line 45, "head" should read --bead--.

Column 8, line 2, insert --or-- between "foil" and "mask".

Column 6, line 36, "Luerlock" should read --Luer-lock--.

Signed and Sealed this

Fifteenth Day of June, 1993

Attest:

MICHAEL K. KIRK

Attesting Officer

Acting Commissioner of Patents and Trademarks